(12) United States Patent
Schmidt

(10) Patent No.: US 11,688,254 B2
(45) Date of Patent: Jun. 27, 2023

(54) ILLUSORY TACTILE SENSATION GENERATION SYSTEM AND METHOD

(71) Applicant: Brian Schmidt, Galena, OH (US)

(72) Inventor: Brian Schmidt, Galena, OH (US)

(*) Notice: Subject to any disclaimer, the term of this patent is extended or adjusted under 35 U.S.C. 154(b) by 166 days.

(21) Appl. No.: 17/192,324

(22) Filed: Mar. 4, 2021

(65) Prior Publication Data

US 2021/0280023 A1 Sep. 9, 2021

Related U.S. Application Data

(60) Provisional application No. 62/984,812, filed on Mar. 4, 2020.

(51) Int. Cl.
  *G08B 6/00* (2006.01)
  *G05B 19/4155* (2006.01)

(52) U.S. Cl.
  CPC ............ *G08B 6/00* (2013.01); *G05B 19/4155* (2013.01); *G05B 2219/37396* (2013.01)

(58) Field of Classification Search
  CPC ...... G05B 2219/37396; G05B 19/4155; G08B 6/00
  USPC ............................................ 340/407.1, 407.2
  See application file for complete search history.

(56) References Cited

U.S. PATENT DOCUMENTS

| | | | |
|---|---|---|---|
| 2003/0227374 A1* | 12/2003 | Ling | G09B 21/003 340/407.1 |
| 2017/0082993 A1* | 3/2017 | Narain | H04W 4/33 |
| 2020/0293111 A1* | 9/2020 | Gwak | G06F 3/016 |
| 2021/0005064 A1* | 1/2021 | Culbertson | G06F 3/014 |

* cited by examiner

*Primary Examiner* — Fekadeselassie Girma
*Assistant Examiner* — Mancil Littlejohn, Jr.
(74) *Attorney, Agent, or Firm* — Standley Law Group LLP; Kenny Pung

(57) ABSTRACT

A illusory tactile sensation generation system and method via which a moving illusory tactile sensation may be created between spaced apart points on a user's skin using as few as two points of contact by varying the intensity at each point.

19 Claims, 1 Drawing Sheet

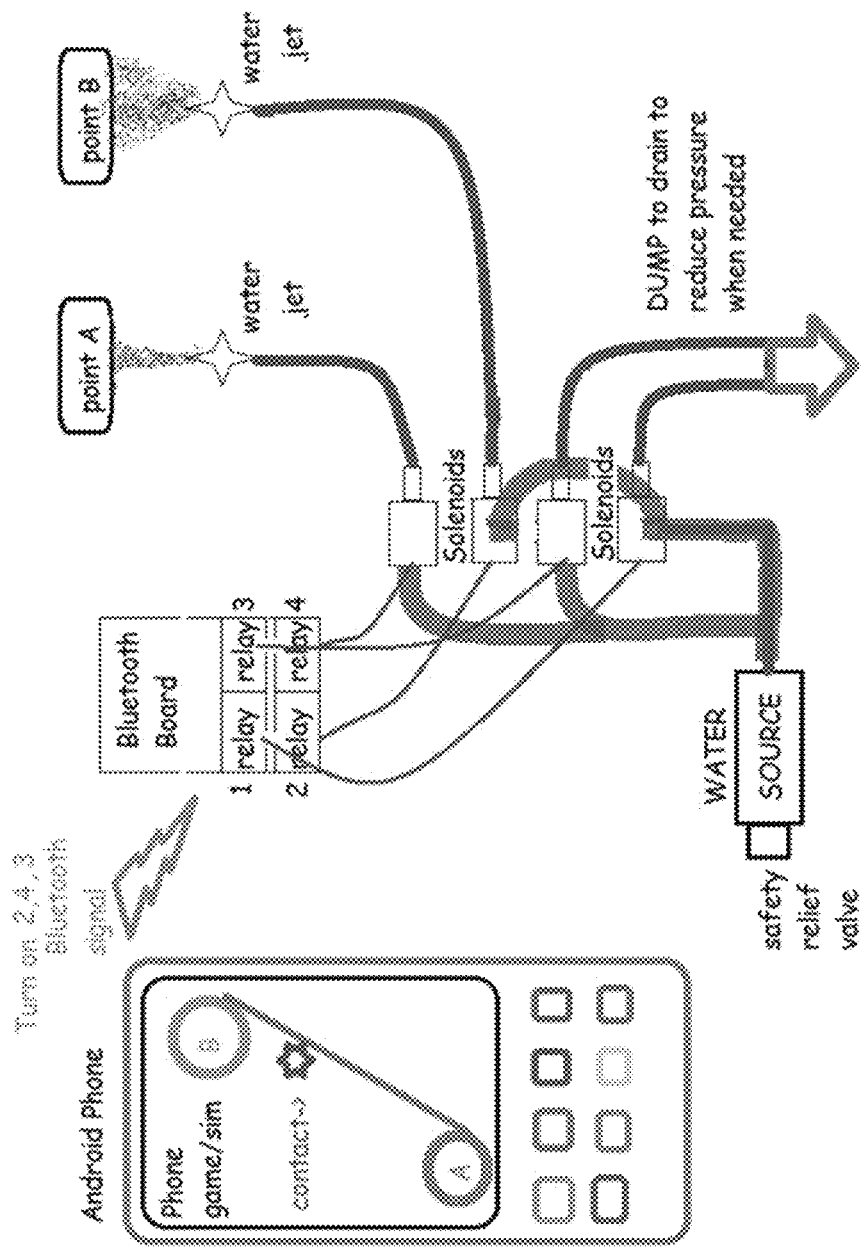

ILLUSORY TACTILE SENSATION GENERATION SYSTEM AND METHOD

CROSS-REFERENCE TO RELATED APPLICATIONS

This application claims the benefit of U.S. Provisional Application No. 62/984,812, filed on Mar. 4, 2020, which is hereby incorporated by reference as if fully recited herein.

TECHNICAL FIELD

Exemplary embodiments of the disclosure relate generally to systems and methods for providing users with the illusion of moving tactile sensation in response to a corresponding experience of an object in a virtual environment.

BACKGROUND

Our digital world continues to expand and become more realistic. For example, the realism and complexity of video games has increased dramatically, videos and movies have improved significantly in both visual and audible presentation, and virtual reality now offers users the ability to step into highly realistic, computer-generated environments. Nonetheless, users continue to want even more immersive experiences.

Digital content has been traditionally experienced primarily with only two senses—sight and hearing. Thus, one way to provide a more immersive "virtual" experience is to involve an additional sense, such as smell, taste and/or touch. To this end, a number of haptic/tactile feedback devices have been developed that allow users to "feel" sensations that are intended to correspond with the experiences of objects in a virtual environment. For example, video game controllers and other user interface devices may move or vibrate to simulate some touch or contact experienced by a virtual object in a video game, or the seats in a movie theater may be made to vibrate or thump during the takeoff of a movie rocket.

To the inventor's knowledge, however, known devices and methods for providing tactile feedback from a virtual environment have produced only very simplistic and generally unrealistic results. For example, the inventor believes there is an unmet need for devices and methods that are capable of imparting realistic and moving illusory tactile sensations to a user. Exemplary system and method embodiments according to the inventive concept satisfy this need.

SUMMARY

Exemplary system and method embodiments are directed to providing a user with an illusory tactile sensation in response to an experience to which an object (e.g., character) is subjected in a virtual environment. The "virtual environment" may be 2-dimensional or 3-dimensional and provided in the form of, for example and without limitation, a computer-generated environment such as an online virtual world (community), a virtual reality space, or a video game. Alternatively, the virtual environment may be a video, or a motion picture (movie). Generally speaking, however, an exemplary system and method may be usable in any scenario where a user observes, or assumes the position of, a digitally-generated or otherwise artificial object/character that is subjected to experiences (e.g., touches, contacts, collisions, impacts, falls, etc.) in the virtual environment that would result in an actual tactile sensation if the user was subjected to the same experiences in the real world.

An exemplary system and method is certainly capable of producing tactile sensations at discrete points or upon localized areas of a user's body. However, of more interest here is the ability of an exemplary system and method to produce complex tactile sensations—particularly moving tactile sensations that traverse the space between two points across larger areas of a user's body. The illusory tactile sensations that may be imparted to a user by an exemplary system and method may simulate an essentially endless number of stimuli, a few examples of which may include an object rolling along or otherwise moving over some length of the user's leg, a feather being dragged across the user's neck, or water running down the user's arm.

While an exemplary system and method may impart to a user illusory tactile sensations of continuous contact along a path between two selected points on the user's body, an exemplary system does not necessarily require the stimulation of a multitude of individual points along the intended stimulation path in order to produce such an effect. In fact, by applying stimuli to as few as two points at/near each end of the intended stimulation path and varying the magnitude and timing of the stimuli accordingly, it is possible to "trick" the user's brain into feeling a tactile sensation at virtually any point between the two points of actual stimulation. Thus, it is possible to produce the illusion of a continuously moving tactile sensation across a considerable length of a user's body using as few as two spaced apart points of stimulation.

Broadly speaking, an exemplary system may communicate with the virtual environment source to receive signals that are used to instruct the system when, where and how to produce an illusory tactile sensation on a user. In the context of a computer-generated virtual environment, for example, contact between one object/character and another object/character produces "collision" signals within the virtual environment coding that may be transmitted to an exemplary system and used to produce an appropriate illusory tactile sensation. Alternatively, contact information associated with a computer-generated virtual environment may be acquired by an exemplary system through a novel technique where objects/characters in the virtual environment are wrapped in a plurality of virtual layers and the parameters (e.g., location and intensity) of a given contact between objects/characters are determined by analyzing how many of said virtual layers are affected (e.g., penetrated) as a result of the contact. Illusory tactile sensations may be produced by an exemplary system based on a number of predetermined time points associated with a virtual environment source.

Illusory moving tactile sensations are produced by an exemplary system via a plurality of associated (e.g., paired) skin stimulation devices that are configured and arranged to stimulate designated and spaced apart locations on the skin of a user. Various types of skin stimulation devices may be used, as described in more detail below.

A hardware controller is provided to individually control each skin stimulation device. The hardware controller receives the aforementioned instructive signals from the virtual environment source via a translator software component (e.g., communications/middleware layer) of the system, which resides between the hardware controller and the virtual environment source. The hardware controller transmits control instructions to the individual skin stimulation devices based on data in signals received from the translator software component. More specifically, the hardware controller appropriately adjusts the timing and the intensity (between zero and some upper limit) of skin stimulation forces applied by each of a pair (or more) of relevant skin stimulation devices in a manner that generates on a user an illusory moving tactile sensation that traverses the space between the skin stimulation devices and is properly timed with a corresponding experience to which an object/character is being subjected in the virtual environment. That is, the instructions provided to the skin stimulation devices by the hardware controller ensure that the generated illusory tactile sensation produced on the skin of the user will accurately correspond to the intensity, timing, location, and direction and rate of movement, of a tactile sensation that would be imparted to an object/character of interest in the virtual environment as a result of some contact with another virtual object/character.

Other aspects and features of the inventive concept will become apparent to those of skill in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and:

FIG. 1 schematically represents one exemplary embodiment of an illusory tactile sensation generation system according to the general inventive concept.

DETAILED DESCRIPTION OF THE EXEMPLARY EMBODIMENTS

As explained above, exemplary systems and methods according to the general inventive concept are designed to produce moving illusory tactile sensations along a path on a user's body that correspond to simulated tactile sensations experienced by an object/character (hereinafter collectively referred to only as "object" for simplicity) in a virtual environment. Exemplary systems and methods preferably take advantage of the phenomenon by which the human brain will "fill in gaps" between spaced points of varying skin stimulation so as to perceive a moving tactile sensation along the entire path between said stimulation points. This phenomenon allows simplified exemplary systems to produce complex illusory moving tactile sensations because, if an exemplary system is able to provide stimulation at two spaced apart points on the skin of a user, then appropriately varying the stimulation intensity and timing at each point allows the system to simulate skin contact (stimulation) anywhere between said points. Thus, an exemplary system may produce the illusion of an object moving continuously along the skin of a user by stimulating only the start and end points on the desired path of movement.

As one specific example of tricking the human brain into "feeling" a moving tactile sensation along the skin, it has been found that by applying hard force near the elbow of a subject and light force at the wrist, and then inversely adjusting the force applied to each location such that the force on the elbow is eventually light and the force on the wrist is eventually hard, the brain can interpret the varying force application as an object (e.g., a tennis ball) moving across the skin along the full length of the arm between the elbow and the wrist, even though the skin of the arm is only being stimulated at two distinct and spaced apart locations.

Such illusory tactile sensations become even more immersive and believable if a subject is able to simultaneously observe a visual depiction corresponding to the illusory tactile sensation. Thus, if the subject in the preceding example is shown a video of a rolling tennis ball, or even better, a video of a tennis ball rolling along a simulated human arm, the illusory tactile sensation is enhanced. When timed correctly, the effect is quite convincing.

Exemplary illusory tactile sensation generation system and method embodiments are described in more detail below. It should be understood when reading said descriptions that the exemplary system embodiments make use of triggering signals in order to operate. In the exemplary embodiments described below, such triggering signals may emanate from digital sources such as computers, smart phones, tablets, video game consoles, etc., while a video game is being played. Alternatively, triggering signals may be provided by similar devices or by video/movie players during the playing of a recorded video or movie. Other types of triggering signals and sources of triggering signals are also possible, and embodiments of the inventive concept are not limited to the examples provided herein.

The code of a computer-generated environment (e.g., video game) typically includes inherent triggering signals that may be used by exemplary illusory tactile sensation generation systems. More specifically, such code is written with contact detection functionality—typically referred to as "collision" detection functionality—that is operative to detect virtual collisions between virtual objects—which may be characters, environmental structure, weapons, vehicles, etc. Based on the nature/identification of the objects that collide, an "OnCollision" function allows for some desired result.

An exemplary illusory tactile sensation generation system can access the generic collision detection functionality of the computer-generated environment code in order to use real-time collision occurrence signals from the computer-generated environment as triggering signals for the system. Virtual objects in a computer-generated environment also have inherent location points that can be mapped to an exemplary illusory tactile sensation generation system so that a collision signal from the computer-generated environment also results in the generation of a properly located illusory tactile sensation at the system end (i.e., on a user).

In the case of videos/movies acting as the virtual environment source, embedded triggering signals are not normally available. That is, unlike the collision detection functionality inherent to a computer-generated environment, videos/movies do not normally contain embedded signals that can be used to automatically trigger an external device. Therefore, when associated with, for example, the playing of a video or a movie, an exemplary illusory tactile sensation generation system may be triggered to produce an illusory tactile sensation based on timing. More specifically, programming associated with the system could be configured to trigger an illusory tactile sensation at the proper time and proper location using a set scripted time index in the movie—in a manner similar to that of the triggering in a player piano.

An exemplary illusory tactile sensation generation system is comprised of various hardware components that interact with various complimentary software components.

In an exemplary system, illusory tactile sensations are physically produced using a plurality of skin stimulation devices that are configured and arranged to appropriately stimulate designated locations on the user's skin (e.g., the elbow and wrist). Depending on the complexity of the illusory tactile sensation generation system, only two or a few skin stimulation devices placed at only one or a limited number of body locations may be used, or a more extensive array of skin stimulation devices may be arranged over a more extensive area of a user's body and mapped by the system. Exemplary skin stimulation devices may be designed for individual application, or skin stimulation devices may be provided as a group or may even be mounted in, for example, an article of clothing such as a suit that when donned properly locates all of the associated skin stimulation devices at proper points along a user's skin. When a multitude of skin stimulation devices are provided, various combinations of the skin stimulation devices may be energized and deenergized with appropriate timing and variability of stimulation intensity to produce illusory tactile sensations of movement along different areas of the user's skin at a desired rate and in a desired direction.

Various types of skin stimulation devices may be used in an exemplary illusory tactile sensation generation system. For example, the required skin stimulation may be accomplished using a skin stimulation device that applies pressure through movement of a hard object against the skin, such as a solenoid or a rotating cam driven by a small stepper motor. Alternatively, hydro-stimulation of the skin by small water jet emitters or electrical stimulation using electrodes, may be used to produce the required skin stimulation. Exemplary illusory tactile sensation generation systems are not, however, limited to operation with any particular type of skin stimulation device.

Whatever type of skin stimulation device is used, it is to be a variable device capable of applying more than just on/off functionality. That is, a given skin stimulation device must be capable of producing different intensity (e.g., pressure) settings, although an analog range of 0%-100% variability is preferable. In the case of hydro-stimulation using water jets in particular, it has been found that the dissipation of water in a device supply line after the water pressure has been cut results in a natural analog reduction in pressure that can reduce design complexity in some situations.

An illusory tactile sensation generation system will require skin stimulation devices at a minimum of two spaced apart touch points on a user's skin, but in practicality it is likely that a given illusory tactile sensation generation system will utilize multiple skin stimulation devices arranged to produce numerous points of skin stimulation. In any case, the location of each skin stimulation device is mapped by/to the system, such that tactile sensations that would be imparted to an object in the virtual environment can be generated on a corresponding location of a user's body. Placing the skin stimulation devices closer together increases the resolution of the illusory tactile sensation effect (i.e., a tighter resolution is more believable). However, the actual distance between each skin stimulation device (skin contact point) in a given illusory tactile sensation generation system may be determined by some balancing of the trade-off between system cost/complexity versus user experience.

Proper operation of an exemplary illusory tactile sensation generation system requires individual control of each skin stimulation device associated therewith (excepting, of course, any skin stimulation devices of a system that are not connected/used for a given application). With respect to an exemplary skin stimulation device that applies force through motor-driven or solenoid-driven movement of a hard object against the skin, as described above, the hardware controller needs to be capable of adjusting the power supplied to the motor or solenoid, such as for example, through use of a variable resistor or voltage regulator. In the case of a skin stimulation device that operates on the principle of electrical stimulation using an electrode, the hardware controller needs to be capable of adjusting the voltage and current applied by the electrode, such as for example, through use of a variable resistor or voltage regulator. In the case of a skin stimulation device that operates on the principle of hydro-stimulation using a water jet or similar device, the hardware controller needs to be capable of adjusting a water supply, such as through use of a water pressure regulator or a series of purge valves to reduce water pressure at certain times.

In an exemplary illusory tactile sensation generation system, the individual skin stimulation devices receive unique control signals from the hardware controller, which operates in cooperation with the translator software component. In a typical system, there may be one dedicated communication channel for each skin stimulation device or, alternatively, each skin stimulation device can be assigned an address, locator number or some other unique identifier such that, for example, a single hardware controller operating on a single frequency can communicate control signals to corresponding (mapped) skin stimulation devices without confusion. It is also possible to create a system that has more skin stimulation devices than communication channels or unique identifiers if not all of the skin stimulation devices are always used (e.g., at least some of the skin stimulation devices are disconnected/unused based on the application). Hence, various functional system configurations are possible, as long as given generated skin stimulation device control signals can be properly routed to the unique skin simulation devices to which said signals correspond. In this regard, communication channels or unique addresses/locator numbers of an illusory tactile sensation generation system are also assigned to various objects (e.g., body parts of a character) in a virtual environment so that contact with the object in the virtual world results in transmission of triggering signals to appropriate ones of the skin stimulation devices of the system.

The communication of skin stimulation device control signals within a given illusory tactile sensation generation system may be wired or wireless, digital or analog, depending on the application and the hardware controller used. No special or unusual method of communication is required. Any standard types of wires, protocols, radio frequency, data compression, multiplexing, etc., can be used. The only required information is the point being addressed and its stimulation (e.g., force, voltage) intensity, with the possible exception of hydro-stimulation applications, where the water pressure will increase and dissipate in an analog fashion, optionally negating the need for the pressure level information.

A translator software component, typically in the form of communications middleware, acts as an intermediary for transmitting information (e.g., control signals) between the virtual environment source and hardware components of an exemplary system. When the virtual environment source is a video game, for example, the translator software component converts game signals into a proper format for transmission to and use by the hardware controller. As would be well understood by one of skill in the art, the translator software component may be provided in various forms. For example, and without limitation, if a video game is running on a computer, tablet or smartphone, the translator software component may comprise communications middleware in the form of a Bluetooth API stack for Bluetooth connectivity, or a cellular transceiver.

Broadly speaking, contact occurrence data from a source (e.g., video game or movie) may be transmitted to an exemplary illusory tactile sensation generation system in the same or a similar manner that haptic feedback signals are transmitted to known haptic feedback devices such as, for example, video game controllers/joysticks, or vibratory or force producing actuators that may be hidden in furniture and used to enhance the experience of watching a movie, or by any other currently known or yet to be developed technique that would be understood as being usable by one of ordinary skill in the art. Therefore, none of the examples provided herein are to be read as limiting in this regard.

The location, timing, intensity, direction and rate of movement of an illusory tactile sensation produced by an exemplary illusory tactile sensation generation system preferably coincides with some contact experienced by an object of interest in the virtual environment. In the context of a computer-generated virtual environment, and particularly the video game art, contact between objects is typically referred to as a "collision", and therefore, that term is used hereinafter instead of "contact" whenever the virtual environment is a computer-generated virtual environment such as a video game. Collisions may be caused by other players in a multi-player networked game/simulation environment, or by non-playable objects in a game/simulation, which may have varied levels of coding, artificial intelligence and machine learning attached.

The translator software component of an exemplary illusory tactile sensation generation system may employ a real-time collision detection software layer to detect collisions between objects within a computer-generated virtual environment. According to this method, the collision detection software monitors the coordinates of objects and user interface devices of the virtual environment (e.g., video game). When a monitored object experiences a collision, a triggering signal is transmitted to the pair (or more) of skin stimulation devices of the system mapped to that object area to cause the skin stimulation devices to stimulate the appropriate area of the user's skin through application of force, electrical current, etc.

Alternatively, an exemplary illusory tactile sensation generation system may employ a method referred to herein as a timed movie mode. According to this alternative methodology, a layer of software code is provided and is operative to cause proper triggering of appropriate skin stimulation devices of the system at a set scripted time index in a video or movie. For example, and without limitation, a timed movie mode methodology may operate to set channel or skin stimulation device address 13 of an exemplary system to a 65% pressure level at a movie time-index of 2 minutes and 14 seconds. Multiple time-index triggers may, of course, be associated with a given video or movie so as to produce a number of desired illusory tactile sensations at the proper times.

Another translator software component layer may be provided to detect how much force has been applied to an object of interest by a collision in the virtual environment, so as to determine the intensity of the stimulation that should be applied to the user's skin by the corresponding skin stimulation devices. Intensity values are included in the instructions transmitted to the skin stimulation devices by the hardware controller.

One exemplary method for detecting how much force has been applied to an object of interest by a collision in a computer-generated virtual environment is to simply capture and translate the many user interface devices that already include a means to detect force (e.g., smart phone and tablet screens, touch pads, drawing tablets etc.), and convert that value to a 1%-100% percentage that is subsequently transmitted to the appropriate skin stimulation device.

Another exemplary method for detecting how much force has been applied to an object of interest by a collision in the virtual environment is to utilize the built-in physics function of many computer-generated virtual environment (e.g., video game, simulator) platforms, which calculates force in order to create a proper reaction of the object(s) involved. For example, in simulating the bouncing of a tennis ball on concrete within a computer-generated virtual environment, the tennis ball must bounce back to a reasonable height. Contrarily, the simulated bouncing of a bowling ball in mud within a computer-generated virtual environment would not result in bounce back of the bowling ball. All materials, weights and forces are calculated by the aforementioned built-in physics function. Thus, an exemplary illusory tactile sensation generation system needs only to translate the unit of force calculated by the built-in physics function to a 0%-100% range.

Yet another exemplary and novel technique for detecting how much force has been applied to an object of interest by a collision in a computer-generated virtual environment is referred to herein as thickness modeling. This technique applies multiple discernable layers to objects within a computer-generated virtual environment. When there is a collision involving an object of interest, the amount of force experienced by the object of interest as a result of the collision can be deduced by determining the number of layers of the object of interest that were affected (e.g., penetrated/passed through) by the other object. For example, imagine the slices of a loaf of bread being poked with a pencil, where a slight poke will dent the first piece of bread but a hard stab might go through the first five or six slices.

The translator software component of an exemplary illusory tactile sensation generation system may also employ an illusion calculation software layer that is utilized to ensure the realism of an illusory tactile sensation generated on a user's skin in the real world. When it is determined that an object collision in a computer-generated virtual environment would result in a tactile sensation located somewhere between two adjacent points (e.g., between the elbow and wrist of a virtual character), the illusion calculation software operates to accurately produce a corresponding illusory tactile sensation on the user's skin using the appropriate skin stimulation devices. To generate the illusion of touch between the corresponding two points on the user's skin, the illusion calculation software determines the distance between the collision point and each adjacent point, converts the distances to a stimulation intensity percentage, and transmits the stimulation intensity percentages to the appropriate skin stimulation devices.

As an example of operation of the illusion calculation software, consider a case where the virtual environment source is a video game having a designated Point A located at game coordinates 40,0,55 and a designated Point B located at game coordinates 40,145,55. Virtual Point A and virtual Point B are each mapped to specific skin stimulation devices of an exemplary illusory tactile sensation generation system (such as through, e.g., hard coding or procedural generation). For example, virtual Point A may coincide with the left hand elbow of a virtual character and Point B may coincide with the left hand wrist of a virtual character, and each of Points A and B may be independently mapped to corresponding skin stimulation devices placed at the left hand elbow and left hand wrist of a user. A collision within the virtual environment is then detected along the path between Point A and Point B at game coordinates 40,65,55. In this example, the illusion calculation software will first determine the absolute distance between Point A and Point B—(40,145,55-40,0,55)=145. Next, the illusion calculation software determines the absolute distance of the collision from each Point-Point A (40,0,55-40,65,55)=65; Point B (40,145,55-40,65,55)=80. A percentage value is then created for each Point by dividing the distance of each Point from the location of the collision by the total distance between the Points (and multiplying by 100 for whole numbers). Thus, the percentage value for Point A=(65/145)*100=44.8% and the percentage value for Point B=(80/145)*100=55.2%. Lastly, each percentage value is subtracted from 100 because the percentage value is intended to indicate the appropriate intensity of skin stimulation not proximity to the collision point, and skin stimulation intensity should be greater at locations that are mapped to virtual points closer to a collision point and lesser at locations that are farther away. Consequently, in this example, Point A=(100−44.8)=55.2% intensity value and Point B=(100−55.2)=44.8% intensity value.

If, for example, an object such as a tennis ball is rolled along the above-identified virtual environment coordinate path in a direction from Point A toward Point B, the intensity percentage values calculated by the illusion calculation software will constantly update—increasing the intensity of the stimulation applied to the user's skin at the left wrist as the tennis ball gets closer to virtual Point B, and decreasing the intensity of the stimulation applied to the user's skin at the left elbow as the tennis ball moves farther away from virtual Point A. Such a variation in skin stimulation intensity—in conjunction with the previously described brain phenomenon—allows an exemplary system to produce the illusion of a moving tactile sensation along the entire coordinate path using as little as two adjacent skin stimulation points.

It is noted that a system user would be distracted by seeing in-game touch point collision detection objects stuck to the objects or characters the user is controlling and interacting with. To resolve this, the touch point collision detection objects can be made transparent or a wrapper object can be placed around said objects to conceal them from view. This helps maintain the quality of the illusion.

One exemplary illusory tactile sensation generation system is schematically illustrated in FIG. 1. As shown, the system includes a hardware controller in the form of a Bluetooth® board and an associated plurality of relays. Two skin stimulation devices in the form of water jet emitters are located at spaced apart Points A and B on a user's skin. Each of the water jet emitters is in fluid communication with a source of pressurized water by way of an intervening dedicated solenoid valve. Additional solenoids are also provided to direct water to a drain to effectuate a pressure reduction when desired. Each solenoid valve is connected to a dedicated one of the hardware controller relays.

The exemplary illusory tactile sensation generation system of FIG. 1 is being used with a computer-generated virtual environment comprising a video game running on a smart phone. Upon occurrence of a collision between objects in the game, skin stimulation device triggering signals and collision data are transmitted from the smart phone to the hardware controller via a middleware Bluetooth signal. The hardware controller uses the triggering signals and associated collision data (as explained above) to control the open/close positions of the various solenoid valves, which thereby regulates the flow rate and pressure of water passing through the solenoid valves that are in communication with the water jet emitters and permits water to be emitted from the appropriate water jet emitters at variable pressures. This allows the water jet emitters of the system to apply skin stimulation forces of varying intensity and timing so as to produce the previously described moving illusory tactile sensation on the skin of the user. In an alternate embodiment, a solenoid valve may again be placed in fluid communication with each water jet emitter, and a pressure regulator may be interposed between the source of pressurized water and each solenoid valve. In this embodiment, the hardware controller uses the triggering signals and associated collision data received from the middleware to adjust the water pressure regulators as needed to control the pressure of the water passed to the solenoid valves and, resultantly, the intensity of the skin stimulation forces produced by the water jet emitters.

Various changes and modifications to the exemplary illusory tactile sensation generation systems and methods described herein may be made within the scope of the general inventive concept. Therefore, while various exemplary embodiments have been described herein, the scope of the inventive concept is not considered limited by such disclosure, and modifications are possible without departing from the spirit of the invention as evidenced by the following claims:

What is claimed is:

1. An illusory tactile sensation generation system, comprising: a pair of skin stimulation devices, the devices for temporary placement on the body of a user, each device producing a skin stimulating force; a translator software component receiving from a computer-generated virtual environment source signals that contain data relative to a surface/skin stimulating event to which an object is subjected in the virtual environment, and to convert the data into a proper format for controlling the pair of skin stimulation devices; and devices, and wherein the translator software component includes an applied force detection software layer: utilizing a built-in physics function of the computer-generated virtual environment, which automatically calculates the magnitude of forces applied to objects in the virtual environment as a result of collisions with other objects; translate the forces calculated by the built-in physics function of the computer-generated virtual environment into a 0%-100% range of magnitudes; transmit virtual object force magnitude values to the hardware controller; a hardware controller receiving converted data from the translator software component and to transmit unique control instructions to each skin stimulation device so as to cause each skin stimulation device to exert a stimulation force with variable intensity and timing; whereby, with the pair of skin stimulation devices placed in a spaced apart relationship on the body of the user, a moving illusory sensation will be generated on the skin of the user along a path between the pair of skin stimulation devices.

2. The system of claim 1, wherein at least one of the skin stimulation devices is a mechanism selected from the group consisting of a solenoid, a motor-powered cam that is selectively rotatable into and out of contact with the skin of the user, a waterjet emitter coupled through a regulation mechanism to a source of pressurized water, and an electrode connected to a source of regulatable electrical current and voltage.

3. The system of claim 1, further comprising a peripheral device or an article of clothing having the pair of skin stimulation devices arranged therein or thereon, such that the skin stimulation devices will be located at spaced apart points on the body of the user and in contact with the skin of the user when the article of clothing is donned.

4. The system of claim 1, wherein a dedicated communication channel is present between each skin stimulation device and the hardware controller.

5. The system of claim 1, wherein the hardware controller operates on a single frequency and each skin stimulation device is assigned a unique identifier, which enables the hardware controller to transmit unique control instructions to each of the skin stimulation devices without confusion.

6. The system of claim 1, wherein the virtual environment is presented on a digital source selected from the group consisting of a computer, a smart phone, a tablet, and a video game console appliance.

7. The system of claim 1, wherein the hardware controller transmits control instructions to the pair of skin stimulation devices that will cause the moving illusory sensation generated on the skin of the user to coincide with the timing, location, intensity and direction and rate of movement, of a tactile sensation that would be imparted to the object in the virtual environment as a result of the surface/skin stimulating event to which the object is subjected.

8. The system of claim 1, wherein the translator software component is communications middleware in a form selected from the group consisting of a Bluetooth API stack and a cellular transceiver.

9. The system of claim 1, wherein the translator software component accesses generic collision detection functionality inherent in code of the computer-generated virtual environment; access location points within the code, and map the location points to corresponding locations on the skin of the user; and use real-time collision occurrence signals generated within the computer-generated virtual environment as triggering signals for the pair of skin stimulation devices and transmit triggering signal data to the hardware controller; whereby the location of the illusory tactile sensation generated on the skin of the user will coincide with the location of a tactile sensation that would be imparted to the object in the video game as a result of contact with another virtual object character.

10. The system of claim 1, wherein the translator software component includes a real-time collision detection software layer receiving from the computer-generated virtual environment coordinates associated with a collision involving an object of interest; determine the intensity of a skin stimulation force that should be applied by each skin stimulation device in order to simulate the tactile sensation that would be imparted to the object in the computer-generated virtual environment as a result of the collision; and transmit skin stimulation device identification data and force application intensity data to the hardware controller.

11. The system of claim 1, wherein the translator software component includes an applied force detection software layer applying multiple discernible virtual layers to objects in the computer-generated virtual environment; monitor collisions between an object of interest and other objects in the virtual environment; and determine the amount of force applied to the object of interest by a given collision with another object in the virtual environment by determining the number of virtual layers of the object of interest that were affected as a result of the collision; determine the intensity of a skin stimulation force that should be applied by each skin stimulation device in order to simulate the tactile sensation that would be imparted to the object of interest in the computer-generated virtual environment as a result of the collision force; and transmit skin stimulation force application intensity data to the hardware controller.

12. The system of claim 1, wherein the translator software component includes an illusion calculation software layer and when it has been determined that a collision of an object/character in the video game virtual environment would result in a tactile sensation located somewhere between two or more adjacent points on the object/character, calculates the distance between the collision point and each adjacent point; convert each calculated distance to a stimulation intensity percentage; and transmit the stimulation intensity percentage values to the hardware controller.

13. The system of claim 1, wherein: the hardware controller includes a Bluetooth board and an associated plurality of relays; the pair of skin stimulation devices are water jet emitters that are located at spaced apart points on the skin of the user, each water jet emitter in fluid communication with a source of pressurized water; a dedicated solenoid valve is interposed between each of the water jet emitters and the source of pressurized water, and additional solenoid valves are associated with each water jet emitter to direct water to a drain so as to effectuate a pressure reduction when needed, each of the solenoid valves connected to a dedicated one of the hardware controller relays; the translator software component transmits skin stimulation device triggering signals and collision data to the hardware controller via a Bluetooth signal; and the hardware controller uses the triggering signals and associated collision data received from the translator software component to adjust the open/close position of the solenoid valves; whereby water will be emitted from the appropriate water jet emitters with variable pressure and proper timing, so as to generate the moving illusory tactile sensation on the skin of the user.

14. A system for generating a moving illusory tactile sensation on the skin of a user, comprising: a computer-generated virtual environment with which the user interacts, the computer-generated virtual environment containing a plurality of virtual objects; a number of skin stimulation devices temporarily placed at various locations on the body of a user, the skin stimulation devices arranged in spaced apart pairs and each device produces a stimulating force on the skin of the user; a translator software component mapping the skin stimulation devices relative to the body of the user, receive from the computer-generated virtual environment signals that contain data relative to collisions to which an object of interest is subjected in the virtual environment, and to convert the data into a proper format for controlling the skin stimulation devices, identify which ones of the skin stimulation devices are in closest proximity to the corresponding location of a given collision experienced by the object of interest within the virtual environment, and determine the intensity of a skin stimulation force that should be applied by each identified skin stimulation device in order to simulate the tactile sensation that would be imparted to the object of interest in the virtual environment as a result of the collision; and a hardware controller receiving converted data from the translator software component and to transmit unique control instructions to each skin stimulation device so as to cause appropriate ones of the skin stimulation devices to exert a stimulation force having variable intensity and timing on the skin of the user; whereby, moving illusory sensations will be generated on the skin of the user along paths between pairs of skin stimulation devices, the moving illusory sensations coinciding with the timing, location, intensity and direction and rate of movement, of tactile sensations that would be imparted to the object of interest in the virtual environment as a result of collisions to which the object of interest is subjected.

15. The system of claim 14, wherein the skin stimulation devices are mechanisms selected from the group consisting of a solenoid, a motor-powered cam that is selectively rotatable into and out of contact with the skin of the user, a waterjet emitter coupled through a regulation mechanism to a source of pressurized water, and an electrode connected to a source of regulatable electrical current and voltage.

16. The system of claim 14, wherein the translator software component includes one or more software layers selected from the group consisting of a real-time collision detection software layer, an applied force detection software layer, and an illusion calculation software layer.

17. A system for generating a moving illusory tactile sensation on the skin of a user, comprising: a computer-generated virtual environment with which the user interacts, the computer-generated virtual environment containing a plurality of virtual objects; a number of water jet skin stimulation devices temporarily placed at various locations on the body of a user, the skin stimulation devices arranged in spaced apart pairs and each device producing a stimulating force on the skin of the user; a source of pressurized water in fluid communication with each water jet emitter; a dedicated solenoid valve interposed between each of the water jet emitters and the source of pressurized water, and additional solenoid valves associated with each water jet emitter to direct water to a drain so as to effectuate a pressure reduction when needed, each of the solenoid valves connected to a dedicated one of the hardware controller relays; a translator software component receiving from the computer-generated virtual environment, signals that contain data relative to collisions to which an object of interest is subjected in the virtual environment, convert the data into a proper format for controlling the skin stimulation devices, and transmit skin stimulation device triggering signals and collision data via a Bluetooth signal; and a hardware controller including a Bluetooth board and an associated plurality of relays, the hardware controller receiving triggering signals and converted data from the translator software component, and use the data received from the translator software component to adjust the open/close position of the solenoid valves; whereby, water will be emitted from the appropriate water jet emitters with variable pressure and proper timing, so as to generate a moving illusory tactile sensation on the skin of the user along paths between pairs of skin stimulation devices, the moving illusory sensations coinciding with the timing, location, intensity and direction and rate of movement, of tactile sensations that would be imparted to the object of interest in the virtual environment as a result of collisions to which the object of interest is subjected.

18. The system of claim 17, wherein the translator software component maps the water jet emitters relative to the body of the user; identify which ones of the water jet emitters are in closest proximity to the corresponding location of a given collision experienced by the object of interest within the virtual environment; and determine the intensity of a skin stimulation force that should be applied by each identified skin stimulation device in order to simulate the tactile sensation that would be imparted to the object of interest in the virtual environment as a result of the collision.

19. The system of claim 17, wherein the translator software component includes one or more software layers selected from the group consisting of a real-time collision detection software layer, an applied force detection software layer, and an illusion calculation software layer.

* * * * *